(12) United States Patent
Bondrescu (10) Patent No.: US 9,473,451 B2
(45) Date of Patent: Oct. 18, 2016

(54) METHODS, SYSTEMS, AND COMPUTER READABLE MEDIA FOR PROVIDING MAPPING INFORMATION ASSOCIATED WITH PORT CONTROL PROTOCOL (PCP) IN A TEST ENVIRONMENT

(71) Applicant: Ixia, Calabasas, CA (US)

(72) Inventor: Adrian Lucian Bondrescu, Caracal (RO)

(73) Assignee: Ixia, Calabasas, CA (US)

( * ) Notice: Subject to any disclaimer, the term of this patent is extended or adjusted under 35 U.S.C. 154(b) by 679 days.

(21) Appl. No.: 13/650,115

(22) Filed: Oct. 11, 2012

(65) Prior Publication Data
US 2014/0089386 A1 Mar. 27, 2014

(30) Foreign Application Priority Data

Sep. 21, 2012 (RO) .................................. 2012-0674

(51) Int. Cl.
G06F 15/16 (2006.01)
H04L 29/12 (2006.01)

(52) U.S. Cl.
CPC ....... *H04L 61/2517* (2013.01); *H04L 61/2582* (2013.01); *H04L 61/2514* (2013.01)

(58) Field of Classification Search
CPC ............... H04L 61/2517; H04L 49/70; H04L 61/2567; H04L 63/20
USPC .......................... 709/203; 370/474, 466, 230
See application file for complete search history.

(56) References Cited

U.S. PATENT DOCUMENTS 7,437,474 B2 * 10/2008 Iyer et al. ..................... 709/238
8,326,919 B1 * 12/2012 Takkallapally et al. ...... 709/203
2001/0013106 A1 * 8/2001 Asano ............................. 714/43
2005/0021702 A1 1/2005 Rangarajan et al.
2011/0058553 A1 3/2011 Brzozowski
2011/0305241 A1 12/2011 Yang
2012/0020359 A1 1/2012 Jiang
2012/0311185 A1 * 12/2012 Li .................................. 709/245
2013/0054762 A1 * 2/2013 Asveren ........................ 709/220
2013/0227170 A1 * 8/2013 Zha et al. ..................... 709/245

FOREIGN PATENT DOCUMENTS

CN            102447630 A    *  5/2012

OTHER PUBLICATIONS

Wing et al., "Port Control Protocol (PCP) draft-ieft-pcp-base-26," pp. 1-101 (Jun. 5, 2012).

(Continued)

*Primary Examiner* — June Sison
*Assistant Examiner* — Dixon Dabipi
(74) *Attorney, Agent, or Firm* — Jenkins, Wilson, Taylor & Hunt, P.A.

(57) ABSTRACT

Methods, systems, and computer readable media for a testing platform involving application traffic are disclosed. According to one method, the method occurs at a testing platform including an emulated port control protocol (PCP) client module for requesting public network addressing information for an emulated application server module and an emulated application client module for sending application traffic. The method includes receiving, from a device under test (DUT), the public network addressing information in response to a PCP request. The method also includes providing mapping information to the emulated application client module, wherein the mapping information includes the public network addressing information.

19 Claims, 7 Drawing Sheets

(56) References Cited

OTHER PUBLICATIONS

Woodyatt, "Recommended Simple Security Capabalities in Customer Premises Equipment (CPE) for Providing Residential IPv6 Internet Service," RFC 6092, pp. 1-36 (Jan. 2011).
Wellington, "Secure Domain Name System (DNS) Dynamic Update," RFC 3007, pp. 1-9 (Nov. 2000).
Vixie et al., "Dynamic Updates in the Domain Name System (DNS Update)," RFC 2136, pp. 1-26 (Apr. 1997).
Communication of European publication number and information on the application of Article 67(3) EPC for European Application No. 13838955.6 (Jul. 1, 2015).
Notification of Transmittal of the International Search Report and the Written Opinion of the International Searching Authority or the Declaration for International Application No. PCT/US2013/061161 (Jan. 16, 2014).
Wing, "Port Control Protocol," The Internet Protocol Journal, vol. 14., No. 4., pp. 1-32 (Dec. 2011).

* cited by examiner

METHODS, SYSTEMS, AND COMPUTER READABLE MEDIA FOR PROVIDING MAPPING INFORMATION ASSOCIATED WITH PORT CONTROL PROTOCOL (PCP) IN A TEST ENVIRONMENT

PRIORITY CLAIM

This application claims the benefit of Romanian Patent Application No. A/00674-2012, filed Sep. 21, 2012; the disclosure of which is incorporated herein by reference in its entirety.

TECHNICAL FIELD

The subject matter described herein relates to network equipment testing. More specifically, the subject matter relates to methods, systems, and computer readable media for providing mapping information associated with PCP in a test environment.

BACKGROUND

In some communications networks, user devices (e.g., smartphones, computers, mobile handsets, or other user equipment (UE)) may act as application clients by requesting information from one or more application servers. Some application servers may be located in a private network or environment. As such, these application servers may communicate with application clients (e.g., user devices) in other networks, such as the Internet, via a network address translator (NAT), a firewall, a customer premise equipment (CPE) router, or a proxy server.

Conventionally, application servers send keep alive traffic to firewalls or NATs so that ports on these devices remain open for receiving incoming traffic. For example, a firewall may be configured to keep a port open if a message is received every few minutes. In this example, an application server may frequently send messages to guarantee that the port is open for incoming traffic from application clients.

Port control protocol (PCP), which is currently under heavy development, is intended to enable application servers to run in private environments (e.g., behind a NAT). PCP is discussed in an IETF draft document entitled "Port Control Protocol (PCP) draft-ietf-pcp-base-26d" dated Jun. 5, 2012, the disclosure of which is incorporated by reference herein in its entirety. PCP can be used to control how incoming packets are forwarded by upstream devices, such as a NAT or a firewall, and to reduce and optimize keep alive traffic. For example, a PCP client component may be communicatively coupled to an application server, such as a web server or a hypertext transfer protocol (HTTP) server. A PCP server component may be communicatively coupled to a firewall or a NAT. Using PCP signaling between the PCP client and PCP server, an application server may negotiate a public IP and port for receiving incoming traffic via the NAT or firewall. Using PCP-negotiated information, the firewall or NAT is capable of sending incoming application traffic to the application server and sending outgoing application traffic from the application server.

While PCP may be useful in facilitating communication between application clients and an application server behind a NAT or a firewall, network equipment simulation and/or testing platforms add further complexity. For example, to properly test a PCP-controllable device, a testing platform may be capable of simulating or emulating a PCP client component, an application server, one or more application clients, and related signaling between such components and the network equipment being tested.

Accordingly, in light of these difficulties, a need exists for methods, systems, and computer readable media for providing mapping information associated with PCP in a test environment.

SUMMARY

Methods, systems, and computer readable media for providing mapping information associated with PCP in a test environment are disclosed. According to one method, the method occurs at a testing platform including an emulated port control protocol (PCP) client module for requesting public network addressing information for an emulated application server module and an emulated application client module for sending application traffic. The method includes receiving, from a device under test (DUT), the public network addressing information in response to a PCP request. The method also includes providing mapping information to the emulated application client module, wherein the mapping information includes the public network addressing information.

A system for providing mapping information associated with PCP in a test environment is also disclosed. The system includes an emulated application client module configured to send application traffic. The system also includes an emulated port control protocol (PCP) client module configured to request public network addressing information for an emulated application server module, wherein the emulated port control protocol (PCP) client module is further configured to receive, from a device under test (DUT), the public network addressing information in response to a PCP request, and to provide mapping information to the emulated application client module for use in sending application traffic, wherein the mapping information includes the public network addressing information.

The subject matter described herein may be implemented in software in combination with hardware and/or firmware. For example, the subject matter described herein may be implemented in software executed by a processor (e.g., a hardware-based processor). In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein. In some embodiments, a module may include a field-programmable gateway array (FPGA), an application-specific integrated circuit (ASIC), or a processor.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for providing mapping information associated with PCP in a test environment. PCP may allow hosts to operate servers for a long time (e.g., a webcam) or a short time (e.g., while playing a game or on a phone call) when behind a NAT, including when behind a carrier-grade NAT (CGN) operated by an Internet service provider or an IPv6 firewall integrated in an CPE router. In particular, PCP may allow applications to create mapping information. The mapping information may include an association between an external or public IP address, protocol, and/or port and an internal or private IP address, protocol, and port. A NAT or a firewall may use the mapping information to forward or route inbound communications from public network that are destined for application servers in private networks.

When testing scenarios involving PCP, it may be desirable to test a device (e.g., a NAT and/or a firewall) under non-trivial load conditions. One significant challenge with respect to such a testing scenario is the need to make the application traffic go from the emulated application client, through a public address, to the emulated application server via the device under testing (DUT), where the public address is negotiated or learned through the use of PCP signaling between an emulated PCP client and an emulated PCP server. However, the mechanism by which the application client obtains knowledge of the PCP-negotiated public address is beyond the scope of the PCP protocol.

Advantageously, aspects of the present subject matter herein may include a test system configured to provide mapping information associated with PCP in a test environment. For example, in a test system, an emulated application client may receive mapping information about one or more emulated application servers. The emulated application client may use the mapping information in generating or modifying packets such that the DUT receives application traffic addressed to one or more public IP addresses and/or port numbers associated with the emulated application servers. For example, the DUT may receive application traffic addressed to public IP addresses and/or port numbers, may modify the packets so that the packets are addressed to private IP addresses and/or port numbers associated with the public IP addresses and/or port numbers, and route the application traffic to the application servers identified by the private IP addresses and/or port numbers.

Figure 1:
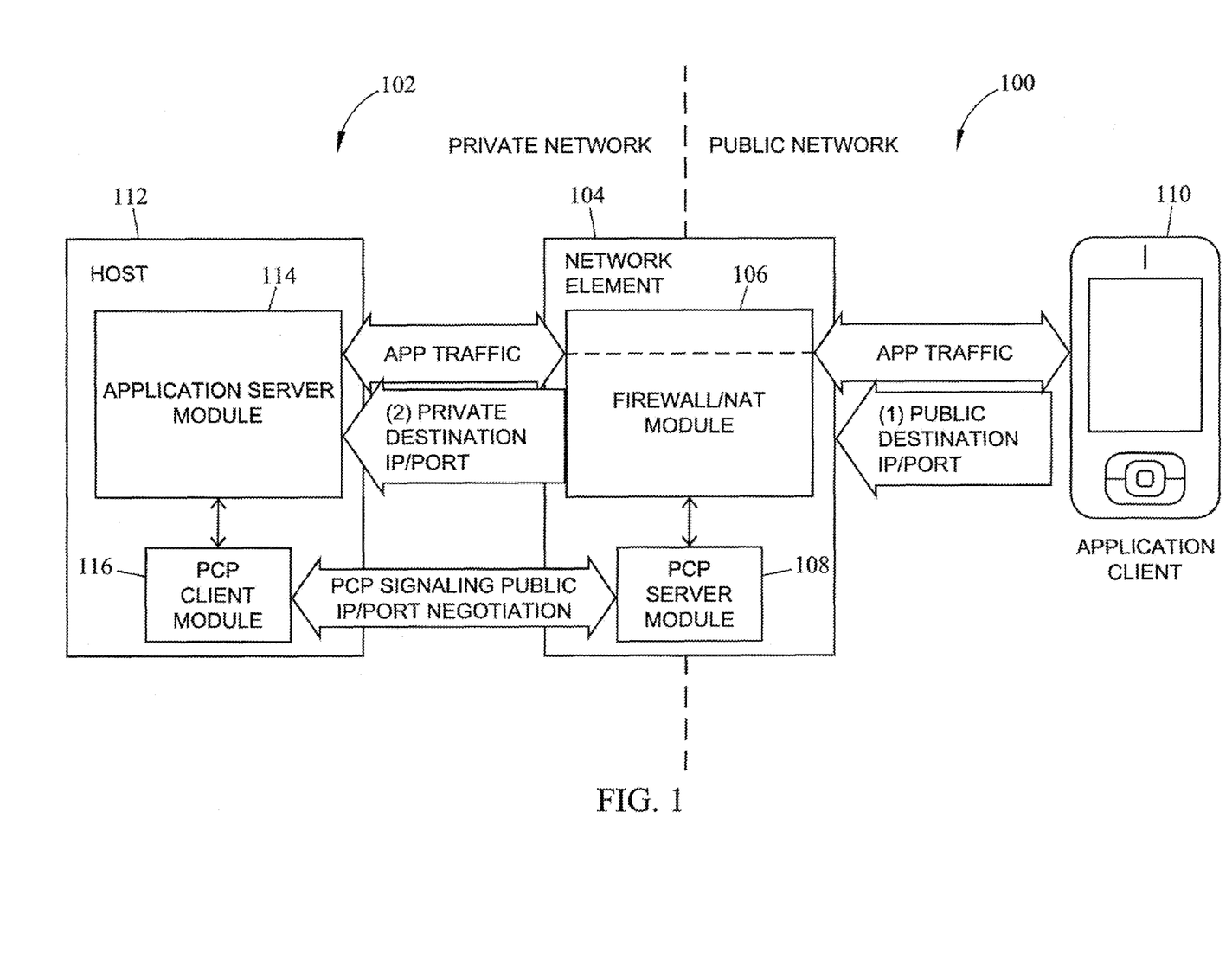
FIG. 1 is a diagram illustrating an exemplary communications scenario involving an application server in a private network and an application client in a public network.

FIG. 1 is a diagram illustrating an exemplary communications scenario involving an application server in a private network and an application client in a public network. Referring to FIG. 1, a network element 104 may be associated with a public network 100 and a private network 102. Network element 104 may be any suitable entity for providing or implementing NAT functionality and/or port control functionality. For example, network element 104 may include any PCP-controllable device, such as a CGN, a small NAT (e.g., a residential NAT), a router (e.g., an Internet protocol version 6 (IPv6) router, an IP version 4 (IPv4) router, and a dual-stack router), a proxy server, or a firewall.

Network element 104 may include a firewall and/or NAT (Firewall/NAT) module 106 and a PCP server module (PSM) 108. Firewall/NAT module 106 may be any suitable entity (e.g., software executing on a processor) that provides filtering, NAT functionality, and/or port control functionality. For example, Firewall/NAT module 106 may control or modify packet flows so as to communicate packets between entities in different networks.

PSM 108 may be any suitable entity (e.g., software executing on a processor) for interacting with a PCP client, a PCP-controllable device, and/or related modules. For example, PSM 108 may communicate with a PCM 116 to determine an appropriate mapping which may be used to configure the PCP-controllable device. In some embodiments, PSM 108 may manage address mapping and/or port control on network element 104. By managing address mapping, the PCP-controllable device may implement policies or flow rules to accept application traffic addressed to certain destinations and forward the traffic to associated private addresses.

Network element 104 may communicate with various nodes in public network 100, such as an application client 110. Application client 110 may be any suitable entity for requesting application data or traffic from an application server. For example, an application client 110 may be a mobile phone or computing device, or a software component (e.g., a web browser) therein.

Network element 104 may also communicate with various nodes in private network 102, such as a host 112. Host 112 may be any suitable entity (e.g., a web server) for communicating with network element 104. For example, host 112 may a computing platform or other system. Host 112 may include an application server module (ASM) 114 and a PCP client module (PCM) 116. ASM 114 may be any suitable entity (e.g., software executing on a processor) configured to handle requests for application traffic from one or more application clients 110.

PCM 116 may be any suitable entity (e.g., software executing on a processor) for interacting with a PCP server, an application server, and/or related modules. For example, PCM 116 may communicate with a PSM 108 to request mapping information, such as a public IP address and/or port number. During PCP signaling, one or more private addresses and/or port numbers associated with ASM 114 or host 112 may be provided to PSM 108. PSM 108 may determine a public IP address, protocol (e.g., IPv6, IPv4, or both), and/or port number for reaching host 112 (e.g., via public network 100) and may send mapping information to PCM 116. For example, a PCP server response (e.g., a notification message) may be self-describing and complete. The response may include mappings or associations of internal (private) and external (public) addresses, protocol, and/or ports and a lifetime associated with the mapping. The lifetime may be used to indicate how long a public IP address will be associated with a private IP address and/or how long firewall/NAT module 106 will continue to map traffic between the addresses.

After a public IP address, protocol, and/or port number is negotiated or determined, remote computers may be informed about the public IP address, protocol, and/or port number. However, it is important to note that PCP does not provide a rendezvous function to inform remote computers. As such, another signaling mechanism is used to inform remote computers (e.g., application client 110) about the public IP address, protocol, and/or port number for connecting to host 112. For example, additional devices, such as a rendezvous server, a SIP proxy server, or a domain name service (DNS) server, and various protocols may be required to inform application client 110.

After application client 110 is informed of the public IP address, protocol, and/or port number via another signaling mechanism, application client 110 may send application traffic (e.g., HTTP requests) addressed to the public IP address, protocol, and/or port number. Network element 104 and/or Firewall/NAT module 106 may receive the application traffic, modify the traffic using stored mapping information, and forward the traffic towards host 112. For example, after receiving a packet from application client 110, Firewall/NAT module 106 may modify a destination address pointing to a public IP address in the received packet to a private IP address associated with host 112. After modification, Firewall/NAT module 106 may send the packet to host 112 and/or ASM 114 for further processing.

After receiving and processing requests from application client 110, host 112 and/or ASM 114 may respond by providing application data or other information. For example, an HTTP or IP response packet may be addressed to application client 110 and include a source address associated with a private IP address identifying host 112. Network element 104 and/or Firewall/NAT module 106 may receive the application traffic, modify the traffic using stored mapping information, and forward the traffic towards application client 110. The traffic received by application client 110 may include a source address associated with a public IP address IP address identifying host 112.

Figure 2:
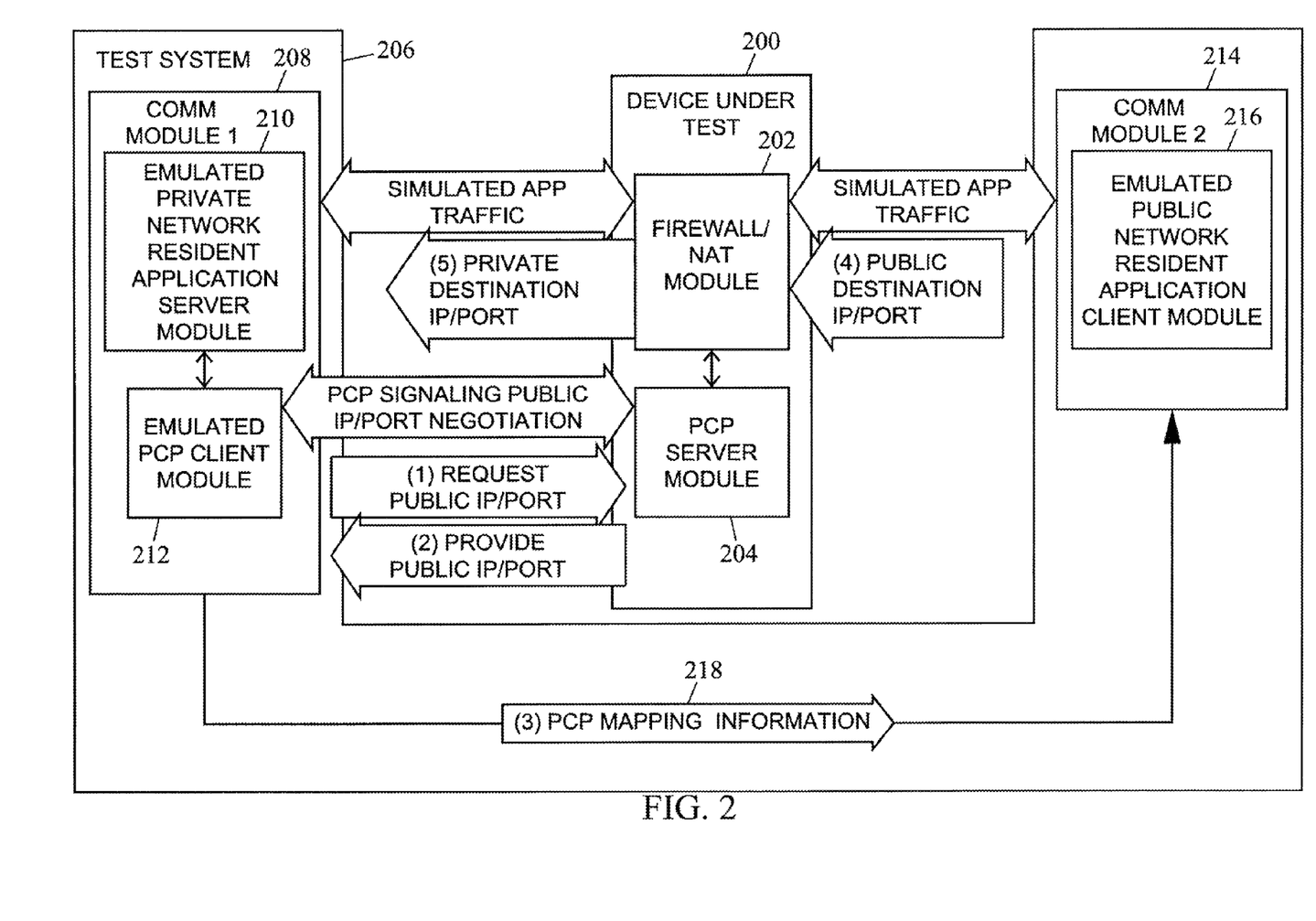
FIG. 2 is a diagram illustrating a test system according to an embodiment of the subject matter described herein.

FIG. 2 is a diagram illustrating a test system according to an embodiment of the subject matter described herein. In the embodiment shown in FIG. 2, a test system 206 may include various modules for testing a PCP-controllable device or DUT 200, such as a network router or proxy server with firewall and/or NAT functionality. In some embodiments, test system 206 may be configured to test the ability of DUT 200 to communicate or route application traffic between an application server in a private network and an application client in a public network.

In some embodiments, test system 206 may be configured to simulate or emulate some or all of the following: an application server and an associated PCP client, and an application client. For example, as illustrated in FIG. 2, test system 206 may include communications module 1 (CM1) 208 and communications module 2 (CM2) 214. CM1 208 and CM2 214 may each be any suitable entity for communicating with a DUT 200. For example, CM1 208 may include one or more network interface cards (NICs) having one or more physical or virtual ports for receiving messages from or sending messages to DUT 200.

In some embodiments, CM1 208 and CM2 214 may include additional modules, such as emulated ASM (EASM) 210 and emulated PCM (EPCM) 212, and/or emulated ACM (EACM) 216. In some embodiments, modules in test system 206 may be configured differently, such as each module being separate or some modules being combined.

In some embodiments, CM1 208 and CM2 214 may be implemented using the same or different hardware or resources. For example, CM1 208 may be associated with a first processor, blade, or card and CM2 214 may be associated with a second processor, blade, or card. In another example, CM1 208 and CM2 214 may both be associated with a first processor, blade, or card.

EASM 210, EPCM 212, and EACM 216 may include similar functionality as described above in regard to ASM 114, PCM 116, and application client 110, respectively. For example, EASM 210 may be configured to handle requests for application traffic from EACM 216, EPCM 212 may be configured to interact with PSM 108 and EASM 210, and EACM 216 may be configured to generate requests for application data or traffic from EASM 210.

As indicated above, one significant challenge with respect to the testing scenario in FIG. 2 is that EACM 216 must somehow gain knowledge of the public network addressing information that has been negotiated by EPCM 212, but the mechanism by which an application client obtains knowledge of the PCP-negotiated public address of DUT 200 is beyond the scope of the PCP protocol.

In accordance with aspects of the present subject matter, mapping information, such as a PCP-negotiated public address of DUT 200 associated with EASM 210, may be distributed internally within test system 206. For example, test system 206 may include functionality for providing mapping information from EPCM 212 to EACM 216. In this example, by internally providing mapping information (e.g., a public IP address and port number) to EACM 216, testing of DUT 200 may be self-contained without requiring additional external resources (e.g., a DNS server) to provide public network addressing information to EACM 216.

In response to providing mapping information to EACM 216, EACM 216 may be configured to modify or generate packets destined to EASM 210. For example, EACM 216 may be preconfigured with or otherwise be aware of private network addressing information (e.g., a private IP address and port number) associated with EASM 210. In this example, EACM 216 may generate packets addressed to EASM 210 using the private network addressing information. However, prior to sending the packets to DUT 200, EACM 216, or another module, may modify the packets using associated public network addressing information obtained from the received mapping information. In another example, EACM 216 may generate packets addressed to EASM 210 using the public network addressing information obtained from the received mapping information.

DUT 200 may receive packets from EACM 216. The packets may include public network addressing information associated with EASM 210. Using mapping information stored at DUT 200, DUT 200 may determine private network addressing information associated with EASM 210, modify the packets to include the private network addressing information, and send the packets to EASM 210.

Figure 3:
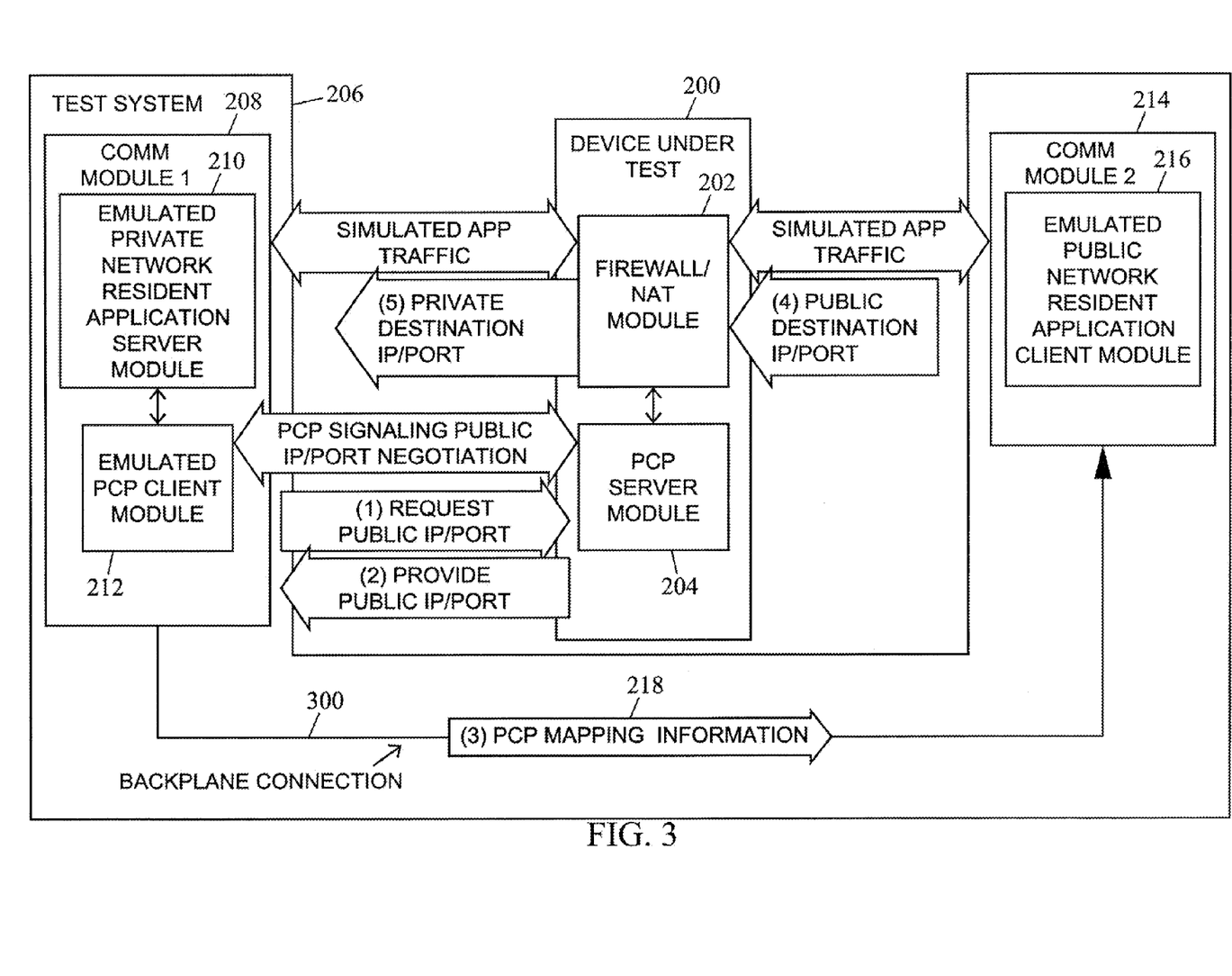
FIG. 3 is a diagram illustrating providing mapping information via an internal connection according to an embodiment of the subject matter described herein.

FIG. 3 is a diagram illustrating providing mapping information via an internal connection according to an embodiment of the subject matter described herein. In the embodiment shown in FIG. 3, CM1 208 and CM2 214 may be co-located within test system 206 and may be communicatively coupled via an internal connection 300. In some embodiments, test system 206 may include one or more hardware platforms or chassis. For example, a first processor blade may be configured as CM1 208 and a second processor blade may be configured as CM2 214. The first and second processor blades may be associated with the same or different hardware platforms or chassis.

In some embodiments, communications between CM1 208 and CM2 214 may be facilitated by an internal connection, such as a backplane connection or a mid-plane connection. For example, in a test system 206 where blades are part of a same platform or chassis, mapping information (e.g., a public IP address and port number for reaching EASM 210) may be sent via an internal communication network or bus, such as an Ethernet fabric or a serial communication bus.

Figure 4:
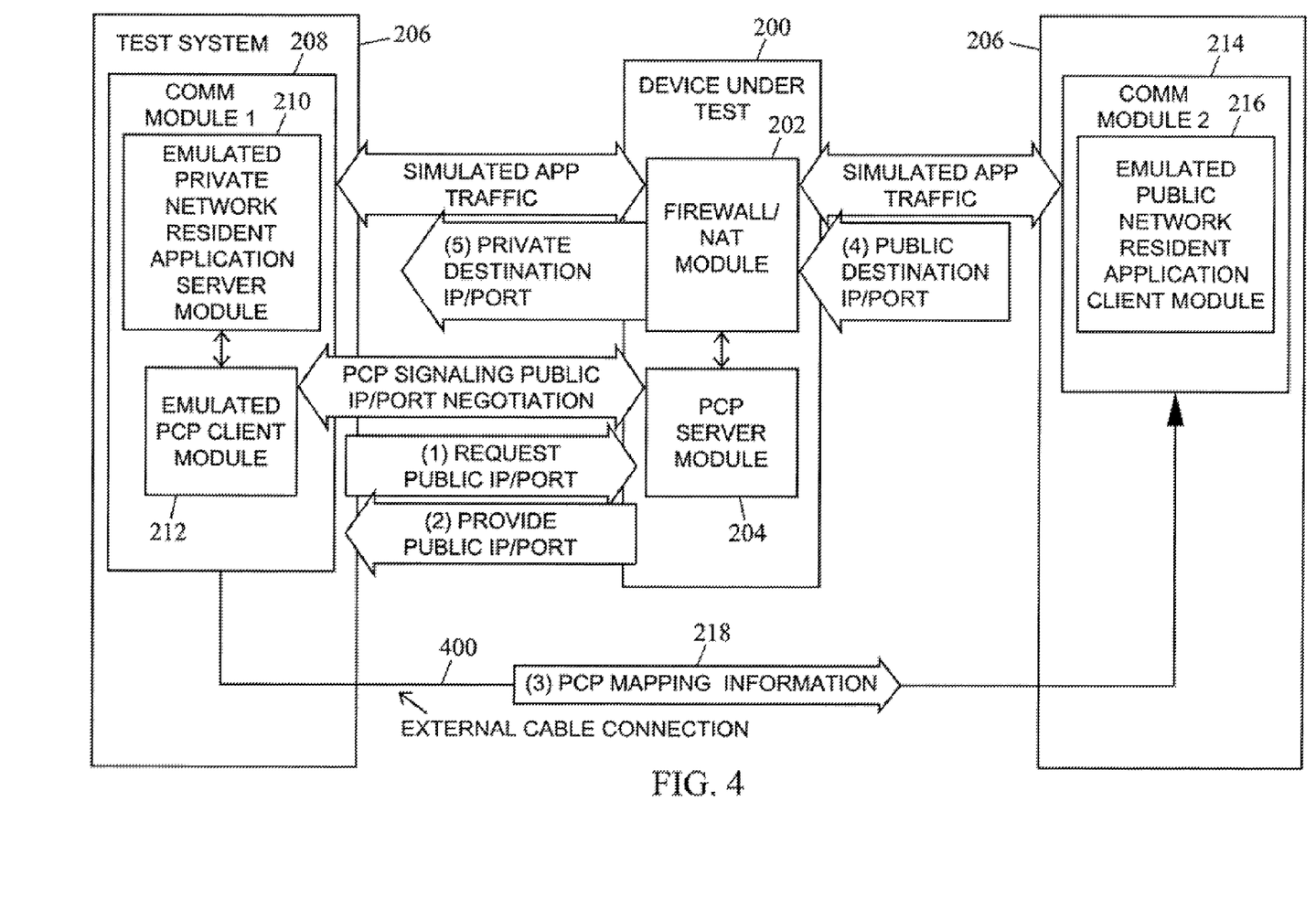
FIG. 4 is a diagram illustrating providing mapping information via an external connection according to an embodiment of the subject matter described herein.

FIG. 4 is a diagram illustrating providing mapping information via an external connection according to an embodiment of the subject matter described herein. In the embodiment shown in FIG. 4, CM1 208 and CM2 214 may be co-located within test system 206 and may be communicatively coupled via an external connection 400. In some embodiments, test system 206 may include one or more hardware platforms or chassis. For example, a first processor blade may be configured as CM1 208 and a second processor blade may be configured as CM2 214. The first and second processor blades may be associated with the same or different hardware platforms or chassis.

In some embodiments, communications between CM1 208 and CM2 214 may be facilitated by an external connection 400, such as an external cable connection. For example, mapping information may be sent via a serial interface cable, such as a fibre channel (FC) cable.

Figure 5:
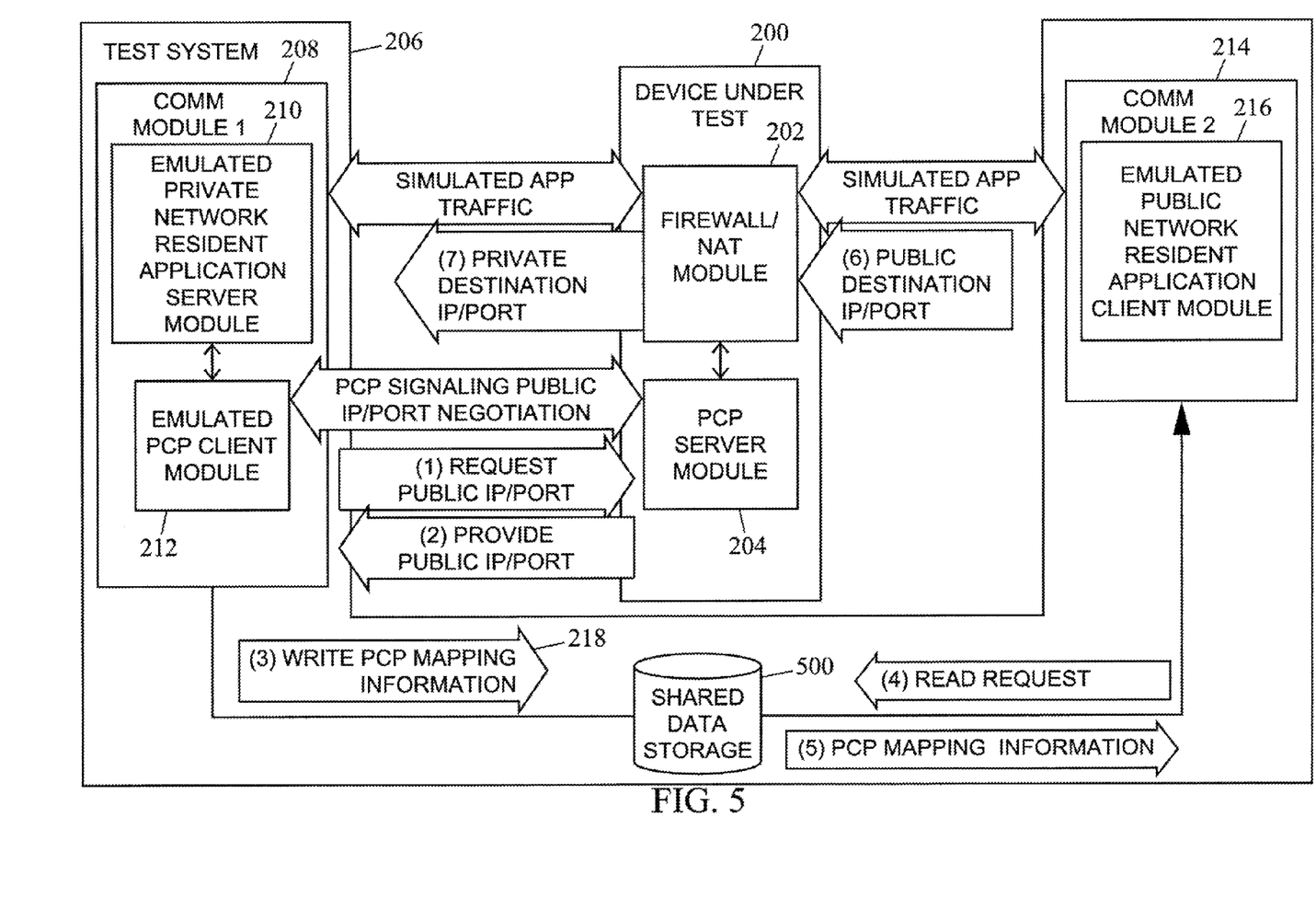
FIG. 5 is a diagram illustrating providing mapping information via shared data storage according to an embodiment of the subject matter described herein.

FIG. 5 is a diagram illustrating providing mapping information via shared data storage according to an embodiment of the subject matter described herein. In the embodiment shown in FIG. 5, CM1 208 and CM2 214 may be co-located within test system 206 and may be communicatively coupled via shared data storage 500. In some embodiments, test system 206 may include one or more hardware platforms or chassis. For example, a first processor blade may be configured as CM1 208 and a second processor blade may be configured as CM2 214. The first and second processor blades may be associated with the same or different hardware platforms or chassis.

In some embodiments, communications between CM1 208 and CM2 214 may be facilitated by a shared data storage 500 that is internal to or accessible by test system 206, or portions therein. Exemplary shared data storage modules may include random access memory, magnetic storage media (e.g., hard disks), optical storage media (e.g., CD, DVD, or Blu-ray discs), or other computer readable media. For example, as illustrated in Figures, CM1 208, or modules therein, may write mapping information to shared data storage 500 and CM2 214, or modules therein, may read the mapping information.

Figure 6:
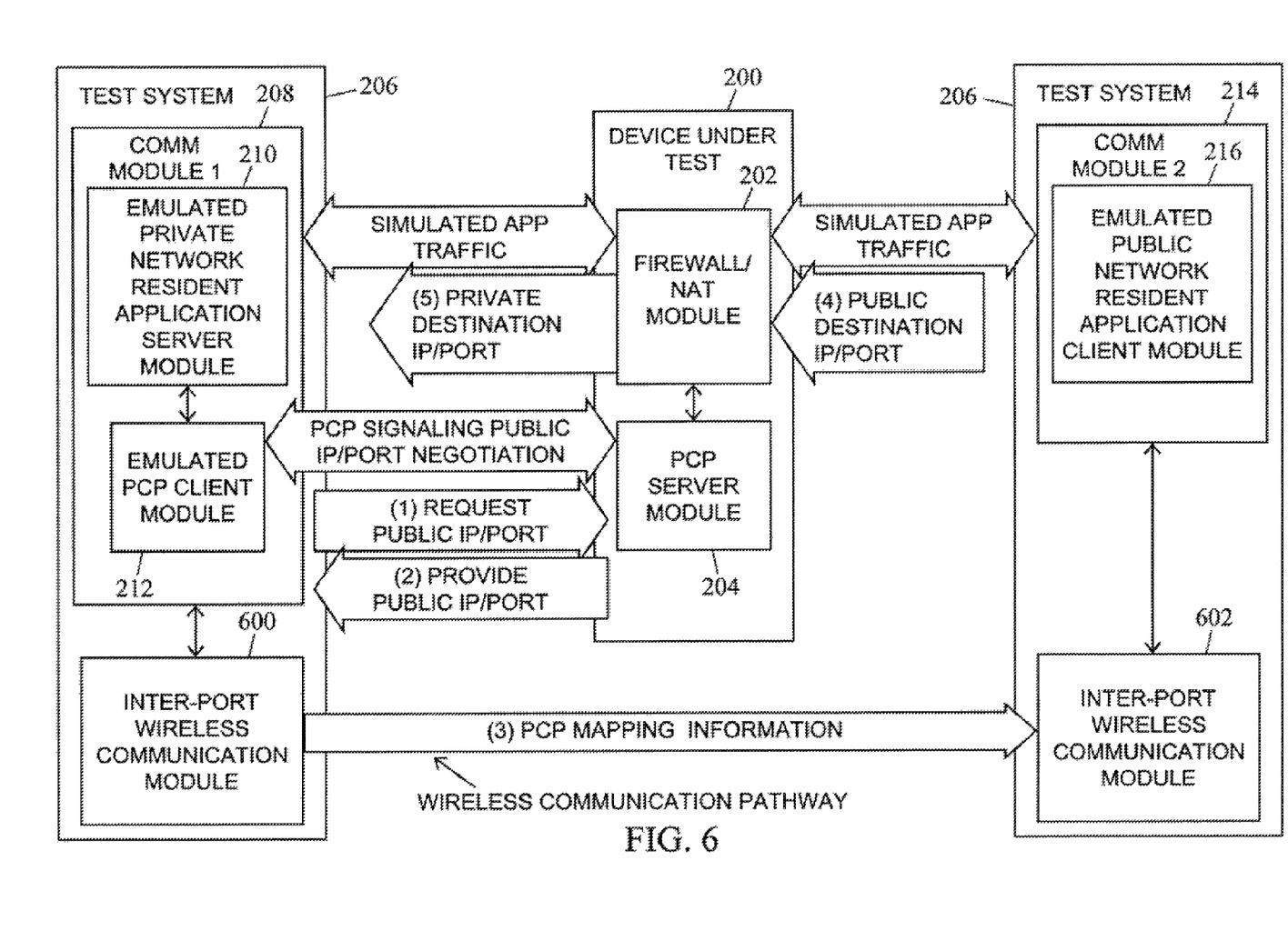
FIG. 6 is a diagram illustrating providing mapping information via a wireless connection according to an embodiment of the subject matter described herein.

FIG. 6 is a diagram illustrating providing mapping information via a wireless connection according to an embodiment of the subject matter described herein. In the embodiment shown in FIG. 6, CM1 208 and CM2 214 may be co-located within test system 206 and may be communicatively coupled via wireless communication modules (WCMs) 600 and 602. In some embodiments, test system 206 may include one or more hardware platforms or chassis. For example, a first processor blade may be configured as CM1 208 and a second processor blade may be configured as CM2 214. The first and second processor blades may be associated with the same or different hardware platforms or chassis.

In some embodiments, communications between CM1 208 and CM2 214 may be facilitated by a wireless connection, such as a Wi-Fi or Bluetooth connection. For example, CM1 208 may include WCM 600 and CM2 214 may include WCM 602. WCM 600 may receive mapping information from CM1 208, or modules therein. WCM 600 may wirelessly transmit mapping information to WCM 602. After receiving the mapping information, WCM 602 may provide the mapping information to CM2 214, or modules therein.

Figure 7:
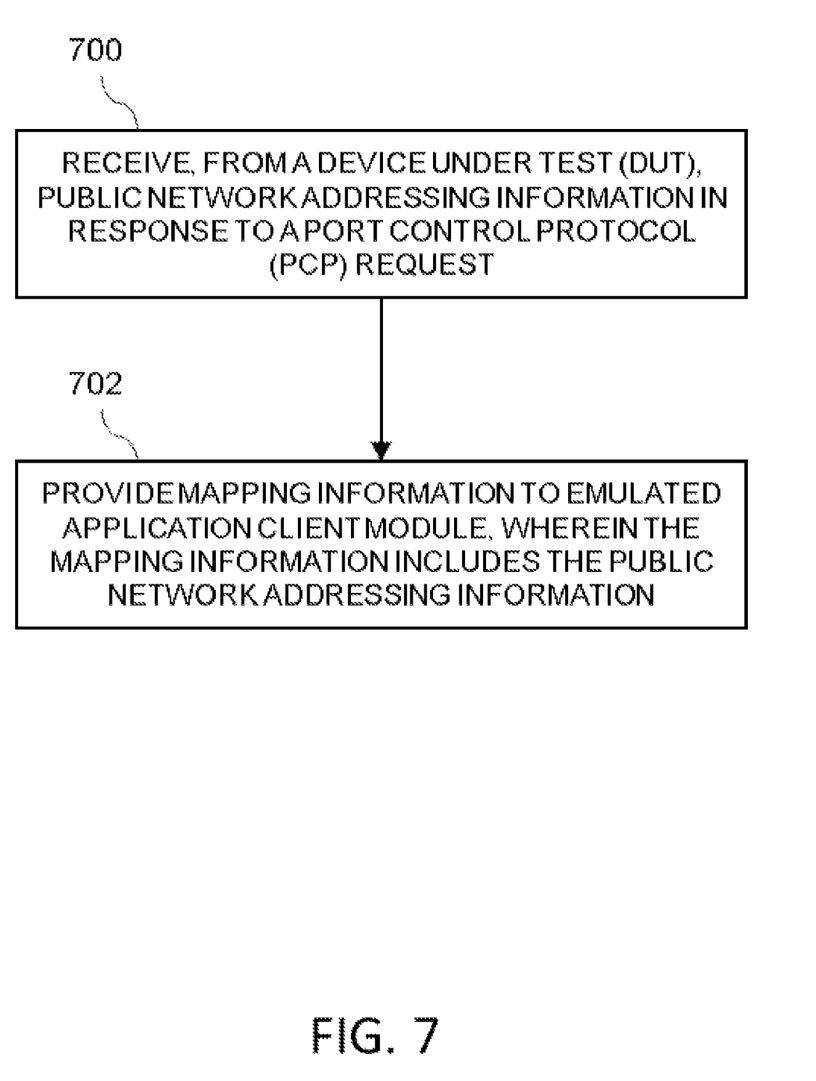
FIG. 7 is a diagram illustrating an exemplary process for providing mapping information associated with PCP in a test environment according to an embodiment of the subject matter described herein.

FIG. 7 is a diagram illustrating an exemplary process for providing mapping information associated with PCP in a test environment according to an embodiment of the subject matter described herein. In some embodiments, the exemplary process described herein, or portions thereof, may be performed by test system 206, DUT 200, and/or another node or module. For example, various actions may be performed by EASM 210, EPCM 212, EACM 216, PSM 204, and/or NAT 202.

In step 700, public network addressing information may be received from a DUT 200 in response to a PCP request. For example, EPCM 212 may send a request for public network addressing information (e.g., a public IP address and a port number) to PSM 204. PSM 204 may respond with the public network addressing information. The public network addressing information may be usable to send application traffic from EACM 216 to EASM 210 via NAT 202.

In step 702, mapping information is provided to EACM 216 for use in sending application traffic, wherein the mapping information includes the public network addressing information. For example, EPCM 212 may generate a message that include mapping information and may send the information to EACM 216 or another module.

In some embodiments, the mapping information includes private network addressing information associated with the public network addressing information.

In some embodiments, the emulated application client module sends incoming application traffic associated with the public network addressing information to the DUT.

In some embodiments, DUT 200 is a network address translator (NAT), a firewall, a router, a proxy, a server, or a gateway.

In some embodiments, test system 206 may include EASM 210. In some embodiments, test system 206 may be distributed across multiple chassis or blades.

In some embodiments, communications may occur between portions of test system 206 via an internal connection (e.g., a backplane connection or a mid-plane connection), an external cable connection (e.g., FireWire, SATA, E-SATA, SCSI, SAS DAS, FC and iSCSI), a wireless connection (e.g., Wi-Fi or Bluetooth), or shared data storage (e.g., a local database or a cache).

In some embodiments, DUT 200 modifies, using private network addressing information associated with the emulated application server module, the incoming application traffic and sends the modified application traffic to the emulated application server module.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing mapping information associated with port control protocol (PCP) in a test environment, the method comprising: at a test system including an emulated port control protocol (PCP) client module for requesting public network addressing information for an emulated application server module and an emulated application client module for sending application traffic:
  receiving, from a device under test (DUT), the public network addressing information in response to a PCP request;
  providing mapping information to the emulated application client module, wherein the mapping information includes the public network addressing information;
  generating, by the application client module, application traffic addressed to the emulated application server module using the public network addressing information; and
  sending, by the application client module, the application traffic to the emulated application server module via the DUT.

2. The method of claim 1 wherein the DUT is a network address translator (NAT), a firewall, a router, a proxy, a server, or a gateway.

3. The method of claim 1 wherein the test system includes the emulated application server module.

4. The method of claim 3 wherein the DUT modifies, using private network addressing information associated with the emulated application server module, the application traffic and sends the modified application traffic to the emulated application server module.

5. The method of claim 1 wherein the DUT includes a PCP server module and a network address translator (NAT) module.

6. The method of claim 1 wherein providing the public network addressing information to the emulated application client module includes sending the public network addressing information via a backplane connection, a mid-plane connection, or an internal connection.

7. The method of claim 1 wherein providing the public network addressing information to the emulated application client module includes storing the public network addressing information in a data storage device that is accessible by the emulated application client module.

8. The method of claim 1 wherein the public network addressing information includes a public Internet protocol address and a port identifier.

9. The method of claim 1 wherein the mapping information includes private network addressing information associated with the public network addressing information.

10. A system for providing mapping information associated with port control protocol (PCP) in a test environment, the system comprising:
  one or more chassis having one or more processors; and
  one or more memories storing instructions that are executable by the one or more processors to operate a test system comprising:
  an emulated application client module configured to generate and send application traffic; and
  an emulated port control protocol (PCP) client module configured to request public network addressing information for an emulated application server module, wherein the PCP client module is further configured to receive, from a device under test (DUT), the public network addressing information in response to a PCP request, and to provide mapping information to the emulated application client module for use in sending application traffic, wherein the mapping information includes the public network addressing information,
  wherein the emulated application client module is configured to generate and send the application traffic via the DUT, wherein the application traffic is addressed to the emulated application server module using the public network addressing information.

11. The system of claim 10 wherein the DUT is a network address translator (NAT), a firewall, a router, a proxy, a server, or a gateway.

12. The system of claim 10 wherein the test system includes the emulated application server module.

13. The system of claim 12 wherein the DUT is configured to modify, using private network addressing information associated with the emulated application server module, the application traffic and sends the modified application traffic to the emulated application server module.

14. The system of claim 10 wherein the OUT includes a PCP server module and a network address translator (NAT) module.

15. The system of claim 10 wherein providing the public network addressing information to the emulated application client module includes sending the public network addressing information via a backplane connection, a mid-plane connection, or an internal connection.

16. The system of claim 10 wherein providing the public network addressing information to the emulated application client module includes storing the public network addressing information in a data storage device that is accessible by the emulated application client module.

17. The system of claim 10 wherein the public network addressing information includes a public Internet protocol address and a port identifier.

18. The system of claim 10 wherein the mapping information includes private network addressing information associated with the public network addressing information.

19. A non-transitory computer readable medium comprising computer executable instructions embodied in a computer readable medium that when executed by a processor of a computer control the computer to perform steps comprising:
  at a test system including an emulated port control protocol (PCP) client module for requesting public network addressing information for an emulated application server module and an emulated application client module for sending application traffic:
  receiving, from a device under test (DUT), the public network addressing information in response to a PCP request;
  providing mapping information to the emulated application client module, wherein the mapping information includes the public network addressing information;
  generating, by the application client module, application traffic addressed to the emulated application server module using the public network addressing information; and
  sending, by the application client module, the application traffic to the emulated application server module via the DUT.

* * * * *